(12) United States Patent
Trott

(10) Patent No.: US 7,946,556 B1
(45) Date of Patent: May 24, 2011

(54) RESILIENT SEAT SEAL FOR A VALVE

(75) Inventor: Donald R. Trott, Guntown, MS (US)

(73) Assignee: SISTAG AG Absperrtechnik, Eschenbach (CH)

( * ) Notice: Subject to any disclaimer, the term of this patent is extended or adjusted under 35 U.S.C. 154(b) by 0 days.

(21) Appl. No.: 12/857,526

(22) Filed: Aug. 16, 2010

(51) Int. Cl.
*F16K 25/00* (2006.01)

(52) U.S. Cl. .................... 251/175; 251/193; 251/359

(58) Field of Classification Search ............. 251/172, 251/173, 175, 193, 195, 196, 359, 326–329; 277/583, 605, 645
See application file for complete search history.

(56) References Cited

U.S. PATENT DOCUMENTS

| | | | | |
|---|---|---|---|---|
| 1,868,147 A | * | 7/1932 | Kruse | 251/172 |
| 3,304,050 A | | 2/1967 | Fawkes | |
| 3,367,625 A | * | 2/1968 | Fortune | 251/172 |
| 3,418,411 A | | 12/1968 | Fawkes | |
| 3,475,004 A | * | 10/1969 | Jennings | 251/175 |
| 3,711,062 A | * | 1/1973 | Kirkwood | 251/172 |
| 4,062,516 A | * | 12/1977 | Grove | 251/174 |
| 4,145,026 A | * | 3/1979 | Chronister | 251/80 |
| 4,776,564 A | * | 10/1988 | Westenberg | 251/172 |
| 5,176,189 A | * | 1/1993 | Perchthaler et al. | 251/172 |
| 5,370,149 A | * | 12/1994 | Clarkson et al. | 251/328 |
| 5,538,029 A | | 7/1996 | Holtgraver | |
| 6,957,816 B2 | * | 10/2005 | Blease et al. | 277/602 |
| 7,309,057 B2 | * | 12/2007 | Santiago | 251/172 |

OTHER PUBLICATIONS

Roto-Disc Company, Roto-Flate—Inflatable Seal Spherical Valves (Dec. 2009), www.rotodisc.com/hand/flate/RotoFlate.pdf, Roto-Disc Company (Milford, Ohio, U.S.A.).
Roto-Disc Company, Roto-Disc Co. Introduces an Inflatable Seal Valve for High-Pressure and Phenmatic Conveying Applications (Jun. 2006), www.rotodisc.com/press/RotoFlatePR.pdf, Roto-Disc Company (Milford, Ohio, U.S.A.).
Roto-Disc Company, Roto-Flate Valve Now Available with Inflatable Seal / Actuator Interlock (Sep. 2007), www.rotodisc.com/press/RotoFlate_DIS_PR.pdf, Roto-Disc Company (Milford, Ohio, U.S.A.).
WEY Valve, Inc., WEY—High Performance Cast Stainless Steel Knife Gate Valve (2008), Bulletin VL0708, 4 pages, www.weyvalve.com/files/Brochure/VL.pdf, WEY Valve, Inc. (Nettleton, Mississippi, U.S.A.).
WEY Valve, Inc., WEY—High Performance Semi-Lugged Knife Gate Valve (2008), Bulletin VS0708, 4 pages, www.weyvalve.com/files/Brochure/VS.pdf, WEY Valve, Inc. (Nettleton, Mississippi, U.S.A.).
WEY Valve, Inc., Model A1/NA1 Knife Gate with Handwheel Actuator (May 1998), Drawing NA-98-1, 1 page, www.weyvalve.com/files/cutsheets/NA-98-1.pdf, WEY Valve, Inc. (Nettleton, Mississippi, U.S.A.).

(Continued)

*Primary Examiner* — John Bastianelli

(74) *Attorney, Agent, or Firm* — Walker, McKenzie & Walker, P.C.

(57) ABSTRACT

A resilient seat seal for a valve. The seal has a closed liquid-filled void therewithin, and the liquid redistributes within the seal as a portion of the seal is compressed, thereby causing effective sealing by all portions of the seal. Examples are shown with the seal used in a knife gate valve, a ball valve, and a butterfly valve. Preferably the seal is made of elastomer or polymer material such as GFLT ("good for low temperature") FKM. The liquid within the void of the seal is preferably an antifreeze liquid such as ethylene glycol.

5 Claims, 5 Drawing Sheets

OTHER PUBLICATIONS

WEY Valve, Inc., Model A1/NA1 Knife Gate with Cylinder Actuator (May 1998), Drawing NA-98-2, 1 page, www.weyvalve.com/files/cutsheets/NA5-cut.pdf, WEY Valve, Inc. (Nettleton, Mississippi, U.S.A.).

WEY Valve, Inc., Model A1/NA1 Knife Gate with Bevel Gear Actuator (May 1998), Drawing NA-98-4, 1 page, www.weyvalve.com/files/cutsheets/NA-98-4.pdf, WEY Valve, Inc. (Nettleton, Mississippi, U.S.A.).

WEY Valve, Inc., Model VLC Knife Gate Valve with Cylinder Actuator (Apr. 1998), Drawing VL-98-2, 1 page, www.weyvalve.com/files/cutsheets/vlc-cutrev1.pdf, WEY Valve, Inc. (Nettleton, Mississippi, U.S.A.).

WEY Valve, Inc., WEY—High Performance Double Block and Bleed Knife Gate Valve (2007), Bulletin DB0707, 4 pages, www.weyvalve.com/files/Brochure/DB.pdf, WEY Valve, Inc. (Nettleton, Mississippi, U.S.A.).

WEY Valve, Inc., WEY Models "NA1" and "A1" Knife Gate Valves—Not Just Another Gate Valve (Jan. 2006), 6 pages, www.weyvalve.com/files/NA1bro.pdf, WEY Valve, Inc. (Nettleton, Mississippi, U.S.A.).

WEY Valve, Inc., WEY—Model TI3 Transmitter Isolation Valve (Mar. 2006), 4 pages, www.weyvalve.com/files/ti3brochure.pdf, WEY Valve, Inc. (Nettleton, Mississippi, U.S.A.).

WEY Valve, Inc., WEY Sheargate Valves (Mar. 2006), 3 pages, www.weyvalve.com/files/sheargatebro.pdf, WEY Valve, Inc. (Nettleton, Mississippi, U.S.A.).

* cited by examiner

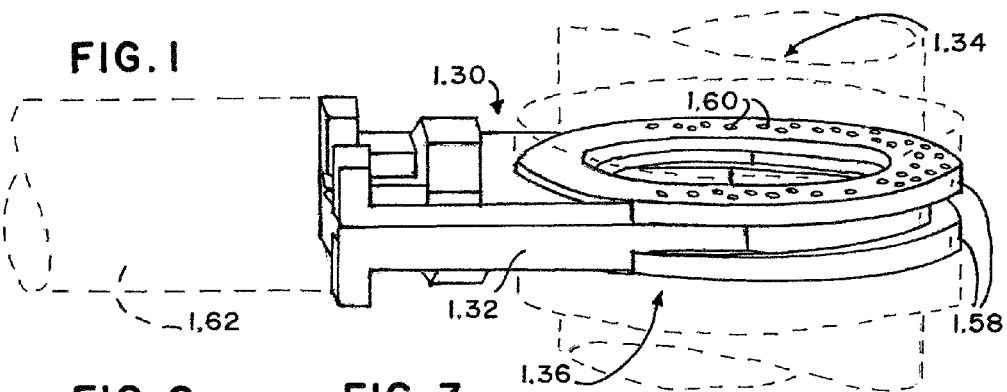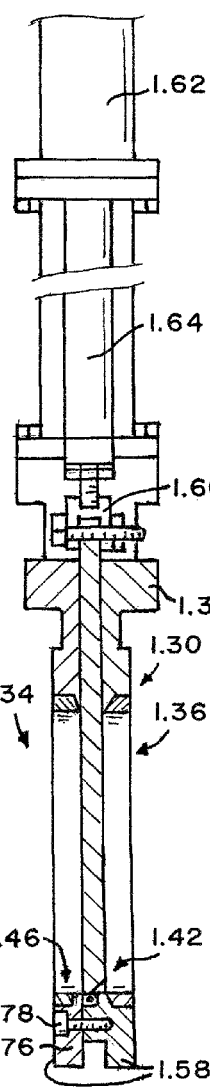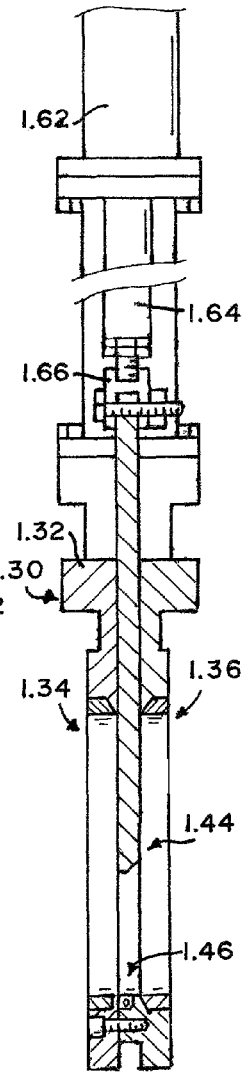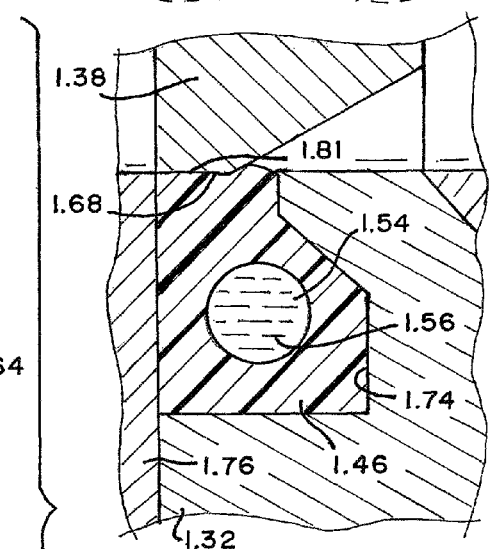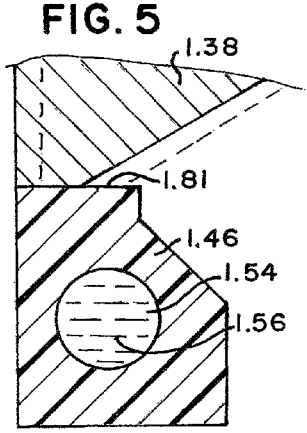

US 7,946,556 B1

RESILIENT SEAT SEAL FOR A VALVE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates, in general, to valves, and in particular, to seats and seals for high pressure valves.

2. Information Disclosure Statement

It is often desired to have a valve for selectively gating liquid from an input port to an output port. Well-known representative solutions for this problem include so-called "knife gate" valves, ball valves, and butterfly valves. With all of these valves, a valve member moves within a valve body, and a seal is interposed between the valve body and the moving valve member. As the valve member moves from an "open" or first position to a "closed" or second position, whether a reciprocating gate, a ball that rotates about an axis, or butterfly flaps or wings that move angularly about an axis, communication between a first port of the valve is selectively opened or closed, as desired.

Furthermore, the pressure rating of the valve is directly affected by the effectiveness of the valve seal that is interposed between the valve body and the valve member, and friction between the valve seal and the moving valve member determines the force required to move the valve member between open and closed positions. Typically, for valves capable of operating under extremely high-pressure, movement of the valve member between open and closed positions is not a frequent event, but, when closed, the valve must withstand extreme pressure at the input port.

A major expense for such valves is the well-known actuator, whether a hydraulic or pneumatic cylinder, or a manually-actuated wheel or lever, or an electric motor actuator, each of which causes the valve member to move between the open and closed positions. As the force necessary for moving the valve member increases, as happens in the prior art as the size (rated flow and rated pressure) of the valve increases, a more powerful actuator is required to move the valve member.

A prior art attempt to solve this problem and to reduce the actuation force required is that offered by the Roto-Disc Company, 50 W. Tecnecenter Drive, Suite B-2, Milford, Ohio 45150, which sells a series of inflatable-seal spherical valves under the trademark Roto-Flate. These valves have an inflatable valve seal that is deflated while the valve member is moving from open to closed positions, and, when the valve member is in the closed position, an external air source inflates the valve seal to cause tight sealing between the valve body and the valve member. Such an approach has the disadvantage of requiring an external air source to inflate the valve seal, together with a control mechanism to inflate and deflate the seal as required. Even so, such a valve with an inflatable seal has a rather low pressure rating on the order of 150 psig (pound-force per square inch gauge).

It is thus desirable to have a valve seal for a valve that can withstand high pressure and which seals the valve member to the valve body without requiring inflation while, at the same time, permits lower-force actuators than heretofore required by such valves.

BRIEF SUMMARY OF THE INVENTION

The present invention is a resilient seat seal for a valve in which a closed void inside the seal has a liquid therein. As the valve closes, the liquid redistributes within the closed void in response to differing compressive pressure against the seal between the valve member and the valve body, causing a superior sealing to occur between the valve member and the valve body as compared to the prior art.

It is an object of the present invention to provide a resilient seat seal for a valve in which the seal permits lower operating forces for moving the valve member than heretofore known in the prior art for equivalent-rating valves, without using inflatable valve seals.

It is a further object of the present invention to provide excellent sealing by the valve seal, i.e., drip-tight and bubble-tight, thereby preventing leakage through the valve from upstream to downstream (whether for uni-directional or bi-directional flow). If the valve body has multiple pieces, the seal should also prevent leakage from inside the valve to the atmosphere. Such a seal may effectively be used in piping systems to open, close, or modulate the flow of gasses, liquids, solids, or mixed-phase media.

BRIEF DESCRIPTION OF THE SEVERAL VIEWS OF THE DRAWING

FIG. 1 is a perspective view of a first embodiment of the invention, namely, a knife gate valve configured with the seal of the present invention.

FIG. 2 is a side view of the first embodiment of the invention, showing the knife gate in a closed position.

FIG. 3 is a side view of the first embodiment of the invention, similar to FIG. 2 but showing the knife gate in an intermediate (raised) position.

FIG. 4 is a close-up section view of a portion of FIG. 2, showing the knife gate in the closed position and pressing against the seal of the first embodiment.

FIG. 5 is a section view similar to FIG. 4, but showing, in dotted outline, how the knife gate can become slightly deflected by pressure at the input port.

DETAILED DESCRIPTION OF THE INVENTION

Figure 6:
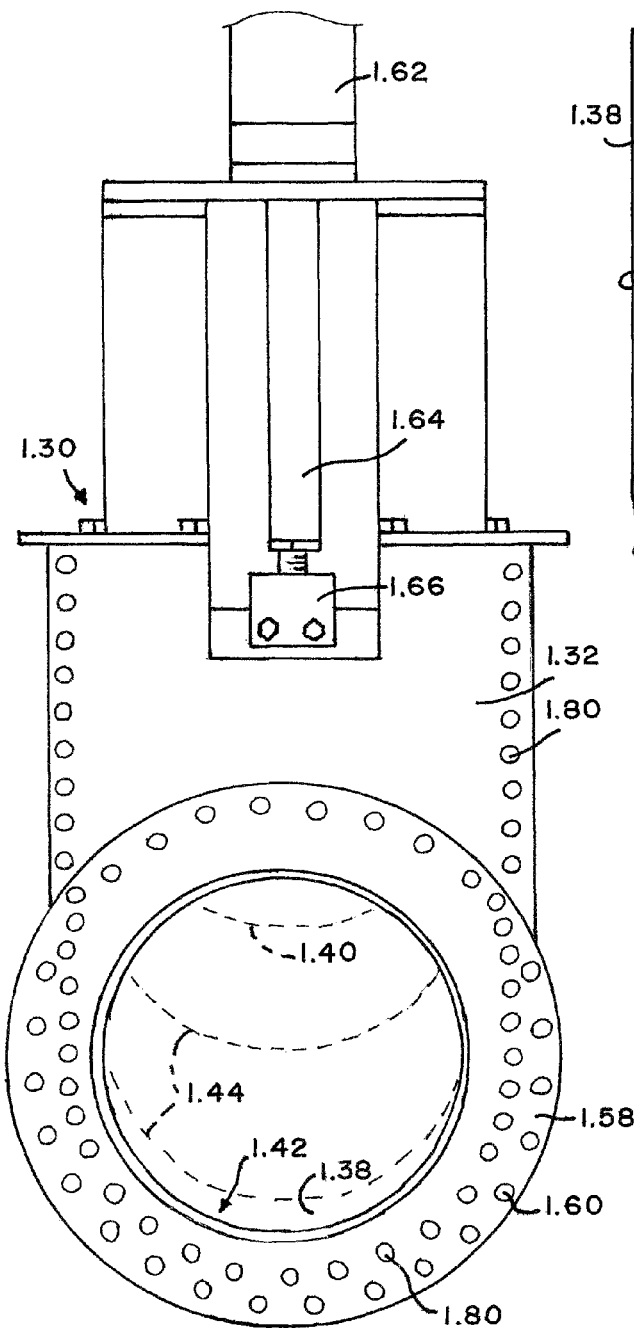
FIG. 6 is a front view of the first embodiment of the invention, showing, in dotted outline, movement of the knife gate from the first (open) position to the second (closed) position, with intermediate positions therebetween.
Figure 7:
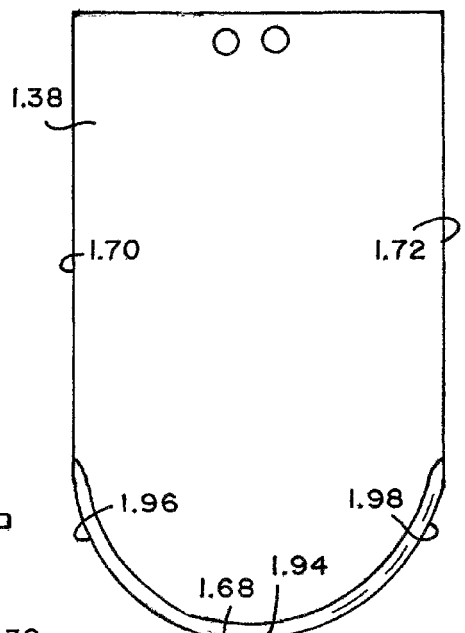
FIG. 7 is a front view of the knife gate of the first embodiment, shown removed from the valve body.

Referring to the figures of the drawings, various embodiments of the present invention are shown. There are many similarities between the various embodiments, and only the differences between the embodiments will be discussed in detail, it being understood that similar structure for the various embodiments serves similar purpose. The reference numerals for the various parts of the embodiments shall be understood to have a prefix identifying the particular embodiments (e.g., "1.", "2.", "3.", etc.) and a suffix identifying the particular structure (e.g., "24", "26", etc.).

Furthermore, because the present invention is used with well-known prior art valves that have been adapted for use with the present invention in a manner hereinafter described, common and well-known parts of the knife gate, ball, and butterfly valves will be recognized by those skilled in the art, and will not be described in great detail except as necessary for an understanding of the present invention.

All embodiments of the valves of the present invention (1.30, 2.30, 3.30) have in common a valve body (1.32, 2.32, 3.32) having a first port (1.34, 2.34, 3.34) and a second port (1.36, 2.36, 3.36). Mounted within the valve body of each is a valve member (1.38, 2.38, 3.38) mounted for movement with respect to the valve body between a first (or "open") position (e.g., 1.40, 2.40), in which the first port is in communication with the second port, and a second (or "closed") position (1.42, 2.42, 3.42), in which the valve member blocks the first port from being in communication with the second port. The valve member also has one or more intermediate positions (e.g., 1.44, 2.44, 3.44) between the first and second positions.

All embodiments of the valves of the present invention further include a resilient seal (1.46, 2.46, 3.46) interposed between the valve body and the valve member. The seal has a first seal portion (1.48, 2.48, 3.48) and an opposed second seal portion (1.50, 2.50, 3.50), and also an intermediate seal portion (1.52, 2.52, 3.52), with the seal having a closed void (1.54, 2.54, 3.54) thereinside extending from the first seal portion to the intermediate seal portion, and the void thereinside also extending from the intermediate seal portion to the second seal portion. Preferably the seal has a single closed void thereinside and is preferably formed by extrusion, molding, machining, etc., of a continuous resilient elastomer or polymer, but it may have a plurality of voids such as, for example, one void from the first seal portion to the intermediate seal portion and a second void from the intermediate seal portion to the second seal portion, it being understood that the plurality of voids can be considered together, functioning for a common purpose. The closed void (1.54, 2.54, 3.54) within the seal of all embodiments is filled with a liquid (1.56, 2.56, 3.56), preferably an antifreeze such as ethylene glycol so that the valve can be used in freezing temperatures. Care should be taken to ensure that no air or gaseous formations remain within the void when the void becomes sealed. It is the incompressibility of the liquid within the void that causes the seal of the present invention to achieve superior results over prior art seals because, as the liquid moves within the void as portions of the seal are compressed, other portions of the seal receive the displaced liquid from the compressed portions of the seal and thus exert added sealing force against the valve member.

For all embodiments, the seal is preferably extruded or molded from a polymer such as GFLT ("good for low temperatures") FKM fluroelastomer, such as is sold by the DuPont Corporation. Depending on the temperature or fluids that will be flowing through the valve, other well-known elastomers may instead be used, such as nitrile (NBR), ethylene propylene (EP EPDM), fluorocarbon (FKM), cloroprene (CR), hydrogenated nitrile (HNBR), styrene butadiene (SBR), polyacrylate (ACM), polyurethane (AU, EU), isobutylene isoorene (IIR), polybutadiene (BR), AEROQUIP® (AQP), synthetic isoprene (IR), natural isoprene (NR), chlorosulfonated polyethylene (CSM), fluorosilicone (FVMQ), silicone (VMQ), chemraz (FFKM), polysulfide (T), chloronated polyethylene (CM), epichlorohydrin (CO, ECO), HYDREL® (copolyester TPE), SANTOPRENE® (copolymer TPO), C-FLEX® (styrenic TPE), ethylene acrylic (EA), polyallomer (linear copolymer), NYLON 11 (polyamide), NYLON 12 (polyamide), ethylene vinyl acetate (EVA), polyvinylchloride flexible (PVC), polyethylene low density (LPDE), KALREZ® (perfluorinated elastomer), FLUORAZ® (fluorinated copolymer), AFLAS® (fluorinated copolymer), NEOPRENE® (copolymer TPO). The essential quality of the seal is that it should be resilient.

Turning now to FIGS. 1-11, specifics of the knife gate valve 1.30 can be explained with which the first embodiment of the seal 1.46 is used.

Figure 10:
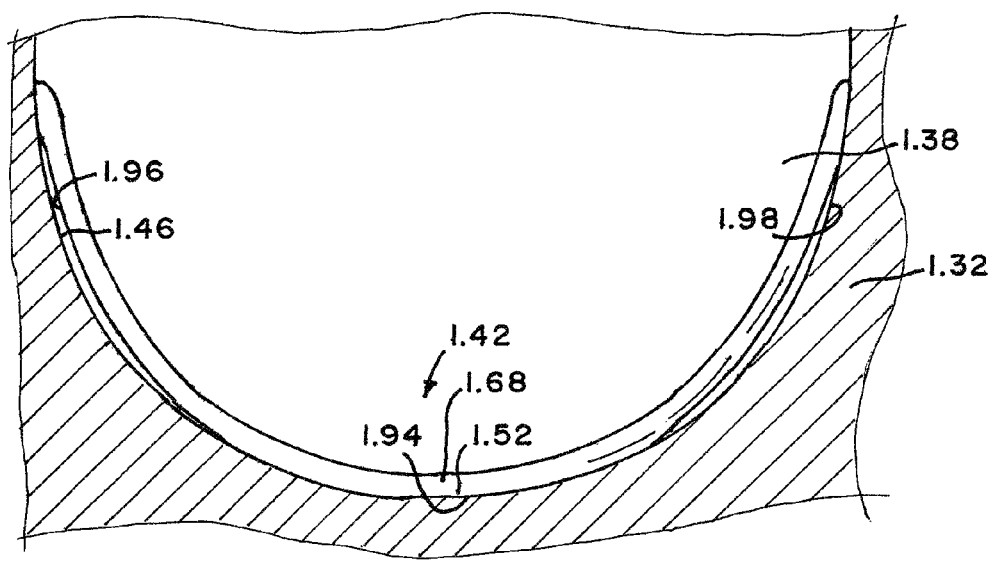
FIG. 10 is an exaggerated partial view showing the meeting of the knife gate of the first embodiment with the seal, exaggerated to show the differing radii of the parts.

As seen best in FIGS. 1 and 6, valve 1.30 has well-known flanges 1.58 to which piping can be attached in a well-known manner, as by bolts through holes 1.60. A well-known actuator 1.62, preferably hydraulic, reciprocates a rod 1.64 that is attached to knife gate valve member 1.38 as by yoke 1.66. As actuator 1.62 causes rod 1.64 to reciprocate, the knife gate 1.38 moves jointly with rod 1.64, thereby causing the knife gate to approach and contact the intermediate portion 1.52 of seal 1.46. As seen best in FIG. 10, the lower end of knife gate 1.38 has a lesser radius than the exposed portion of seal 1.46, thereby causing the leading edge 1.68 of knife gate 1.38 to contact intermediate portion 1.52 with increasing force as knife gate 1.38 moves through the intermediate positions into the second (closed) position 1.42. At the same time, due to the greater radius of the exposed portion of seal 1.46, some of the liquid 1.56 is caused to move within the void from intermediate seal portion 1.52 to first and second seal portions 1.48, 1.50, thereby increasing the sealing between seal 1.46 and the sides 1.70, 1.72 of knife gate 1.38 shown in FIG. 7. This forcing of the substantially incompressible liquid 1.56 within the void 1.54 to the sides of the seal caused the sealing forces between the seal and the sides of the knife gate to increase as the gate becomes fully closed, without incurring those sealing forces during the movement of the knife gate until the last moment of closing. This causes the valve to have lower operating forces required for movement of the knife gate during opening and closing of the valve, thereby permitting a less expensive actuator to be used than heretofore possible in the prior art. Although the illustration shown in FIG. 10 is somewhat exaggerated for sake of explanation, preferably the bottom edge of knife gate 1.38 is a semi-circle, whereas the radius of the valve seat with which knife gate 1.38 engages is slightly elliptical with a slightly larger radius such that there is a gap of about 0.030 inch between each side of knife gate 1.38 and seal 1.46 when the leading edge of knife gate 1.38 just touches seal 1.46. It is desirable that the valve seal seat of a knife gate valve be semi-circular, with a full or almost-full 180 degree arc, so that the curve of the seal seat matches the curve of the inlet and outlet ports, thereby ensuring a laminar flow through the valve with lower turbulence. With this structure, the exposed surface of the seal thus forms a portion of an ellipse proximate the leading edge of the knife gate valve member, the leading edge of the knife gate valve member forms a partial circular curve, with the partial circular curve having a tip 1.94 and first and second curve portions 1.96, 1.98 adjacent the tip 1.94, with first and second curve portions 1.96, 1.98 being spaced further from the seal 1.46 than the tip is to the seal when the knife gate valve member is in at least some of its intermediate positions, not fully closed.

Referring to FIG. 4, seal 1.46 is received within a channel 1.74 in the valve body 1.32, and is entrappingly sandwiched within channel 1.74 as the removable portion 1.76 of valve body 1.32 is secured to the valve body as by screws 1.78 (see FIG. 2) inserted through holes 1.80 and threadedly received into valve body 1.32. Thus retained within channel 1.74, a seat portion 1.81 (see FIGS. 4 and 5) of seal 1.46 is exposed for contacting with the knife gate 1.38. For a high pressure knife gate valve, preferably the leading edge 1.68 of knife gate 1.38 has a 0.25 inch flat portion width (as compared to a 0.098 for prior art valves) for contacting the face of seal 1.46 so that, as shown in FIG. 5 in dotted outline, when the knife gate 1.38 becomes deflected by the extreme pressures at the input port, the leading edge of knife gate 1.38 will remain in full contact with seal 1.46. It should be understood that the deflection shown in FIG. 5 is exaggerated somewhat for clarity. In practice, this deflection has been observed to be a few thousandths of an inch.

Figure 8:
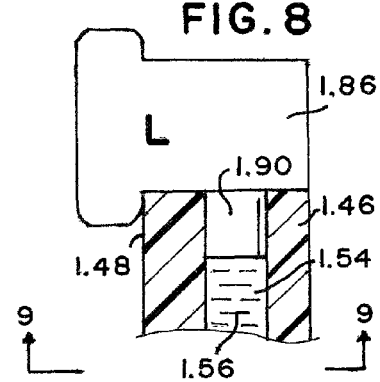
FIG. 8 is a partial section view of a first end of the valve seal of the first embodiment, showing how the seal's void is plugged at the first end and showing the first seal retaining cap.
Figure 9:
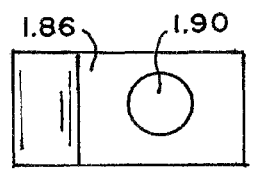
FIG. 9 is a view of the first seal retaining cap, taken along the line 9-9 shown in FIG. 8 and with the seal removed from the seal retaining cap.
Figure 11:
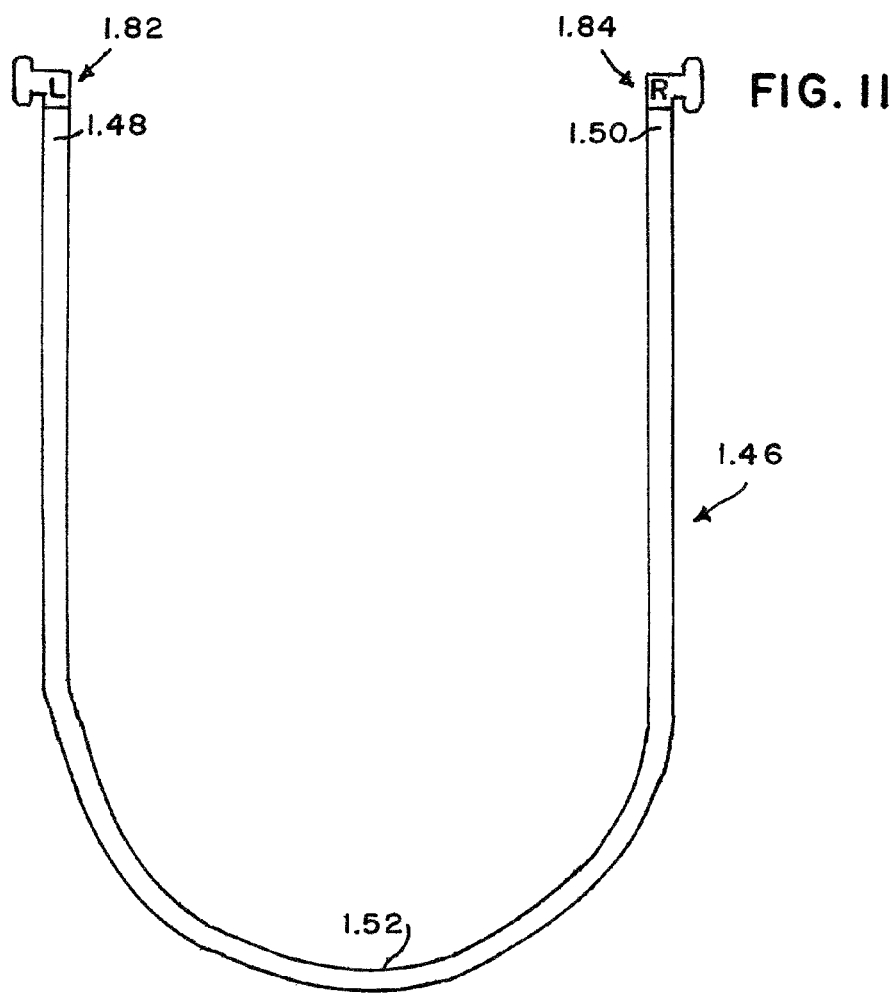
FIG. 11 is a view of the seal of the first embodiment of the invention.
Figure 12:
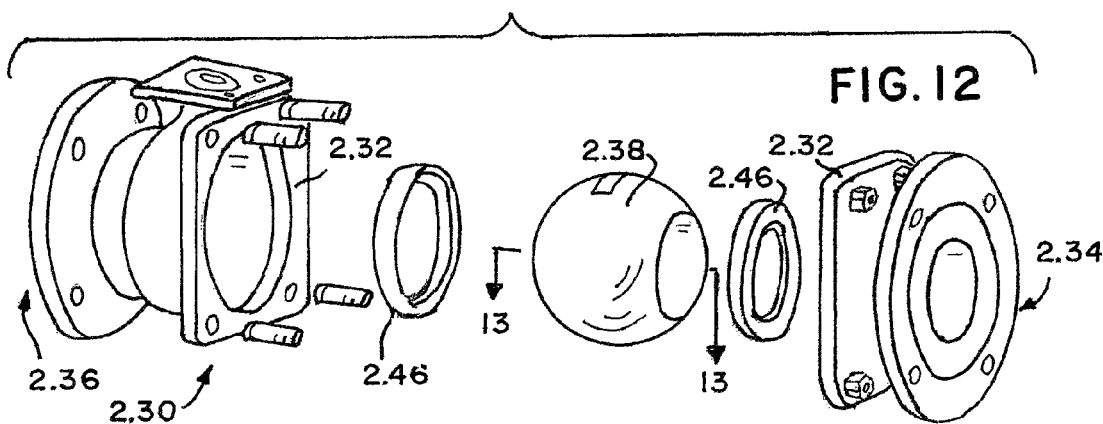
FIG. 12 is an exploded view of a second embodiment of the present invention, namely, a ball valve adapted for use with the seal of the present invention.

As best seen in FIGS. 4 and 5, which show a transverse section of seal 1.46, seal 1.46 is preferably extruded, with a continuous void 1.54 running therealong inside seal 1.46. Referring to FIGS. 8, 9, and 11, the first and second ends 1.82, 1.84 of seal 1.46 are respectively capped, thereby closing void 1.46, by first and second seal retaining caps 1.86, 1.88. It shall be understood that caps 1.86 and 1.88 are similar and preferably mirror images of each other, so that a description of first seal retaining cap 1.86, shown in FIGS. 8, 9, and 11, will suffice for both.

Seal retaining cap 1.86 is preferably molded of the same material as seal 1.46, and has a cylindrical post 1.90 extending therefrom, with post 1.90 being of like diameter as the diameter of void 1.54. Post 1.90 is securely sealed within the end 1.48 of seal 1.46 as by a strong adhesive or glue such as that sold under the trademark GORILLA GLUE by Gorilla Glue, Inc., based in Cincinnati, Ohio, U.S.A. Equivalently, vulcanizing or other adhesive methods could be used if a secure sealing bond is achieved for post 1.90 within the void of seal 1.46. For ensuring correct assembly of seal 1.46 within valve body 1.32, indicia such as "L" (for left) or "R" (for right) may be molded onto retaining caps 1.86, 1.88. Seal retaining caps 1.86 and 1.88 are inserted into and held within machined recesses in valve body 1.32 so as to keep seal 1.46 from sliding within channel 1.74 (see FIG. 4) as knife gate 1.38 movingly reciprocates within the valve body to open and close the valve.

To use valve 1.30, pipes are attached to the first and second ports of the valve, and the knife gate 1.38 is caused to be reciprocated by actuator 1.62, thereby opening and closing the valve in a manner now understood.

Turning to FIGS. 12-17, the second embodiment of the present invention can be described, this time with the seal of the present invention being used within a modified ball valve.

Figure 13:
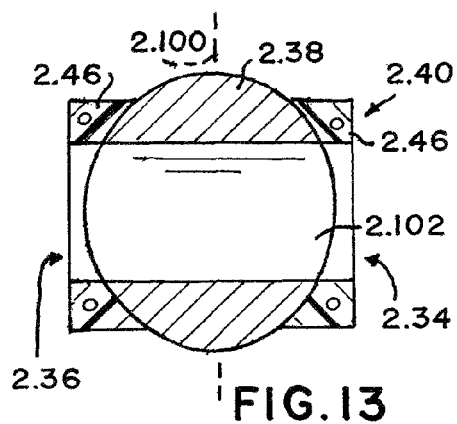
FIG. 13 is a partial sectional view, taken along the line 13-13 shown in FIG. 12, showing the non-spherical ball in a first (open) position and against the valve seals of the present invention.
Figure 15:
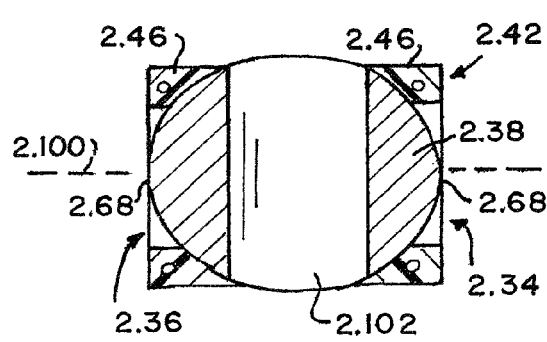
FIG. 15 is similar to FIG. 14, but showing the ball in a second (closed) position.
Figure 14:
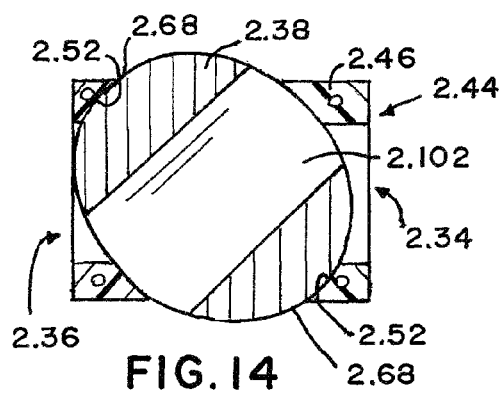
FIG. 14 is similar to FIG. 13, but showing the ball in an intermediate (partially closed) position.
Figure 16:
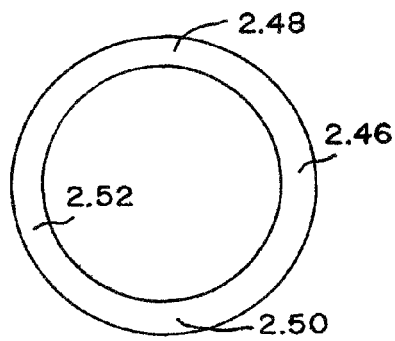
FIG. 16 is a view of one of the seals of the second embodiment of the present invention.
Figure 17:
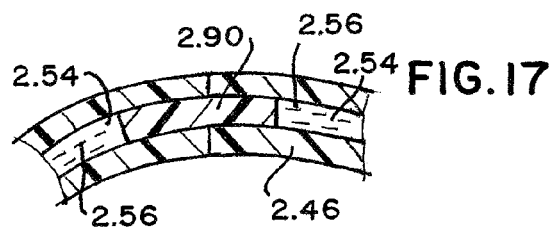
FIG. 17 is an enlarged partial section of one the seals of the second embodiment of the present invention, showing the plugging of the liquid-filled void in the seal.

Unlike a well-known standard ball valve, which has a spherical ball as the movable valve member, the preferred second embodiment valve 2.30 preferably has a ball 2.38 that is shaped as a prolate spheroid, which is defined as the shape resulting when an ellipse is rotated about its major (longest) axis. As seen in FIGS. 13 and 15, ball 2.38 has a major axis 2.100 of symmetry, and has a bore 2.102 transverse to axis 2.100 to provide communication between first and second ports 2.34 and 2.36 when ball 2.38 is in the first (open) position shown in FIG. 13. Valve 2.30 preferably has two substantially similar seals 2.46, so that a description of one suffices for both. As shown in FIG. 16, seal 2.46 is an annulus with a hole therethrough and, as shown in FIG. 17, has a void 2.54 therethroughout. After the void has been filled with liquid 2.56, the ends of the seal are plugged to each other by a cylindrical plug 2.90, held in place similar to the manner used with the plug 1.90 of the first embodiment.

As seen in FIGS. 13-16, as the prolate spheroid ball 2.38 is rotated from the first (open) position to the second (closed) position, the elongated ends 2.68 contact intermediate seal portion 2.52 with greater compressive force than do the minor axis dimensions of ball 2.38, thereby causing the liquid 2.56 to move within seals 2.46 in a manner similar to that described with the first embodiment, causing superior sealing to occur. A well-known actuator for rotating ball 2.38 is omitted from the drawing figures for the second embodiment because such actuators are well-known to those skilled in the art.

To use valve 2.30, pipes are attached to the first and second ports of the valve, and the ball 2.38 is caused to rotate by an actuator, thereby opening and closing the valve in a manner now understood.

Figure 18:
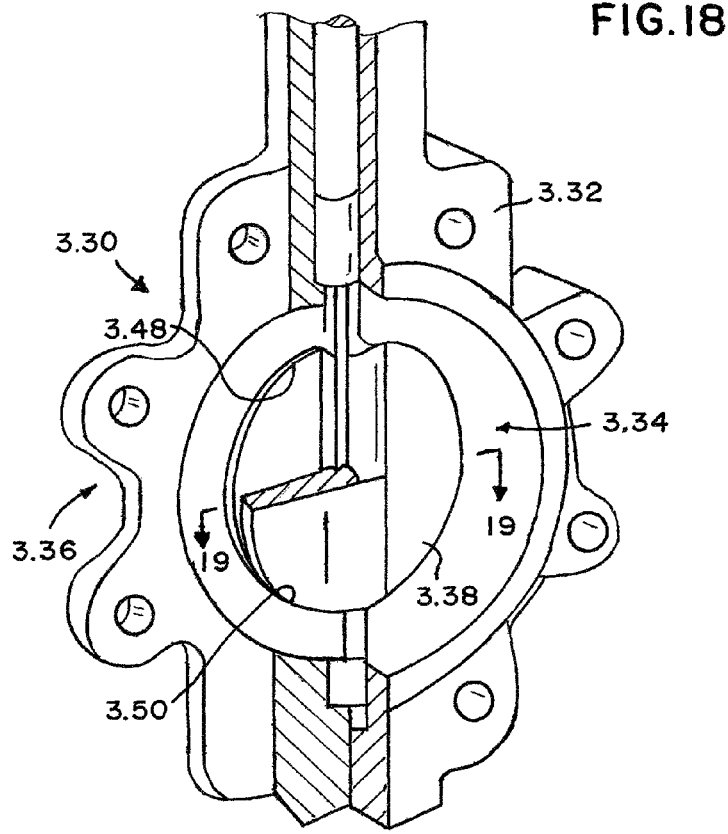
FIG. 18 is a perspective partial sectional view of a third embodiment of the present invention, namely, a butterfly valve using the seal of the present invention.
Figure 19:
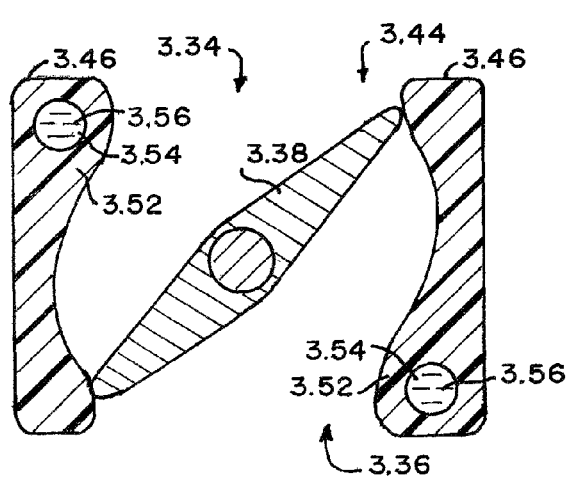
FIG. 19 is a partial sectional view of the third embodiment of the present invention, taken along the line 19-19 shown in FIG. 18 and showing the butterfly wings in an intermediate position as they begin to contact the seals of the present invention.
Figure 20:
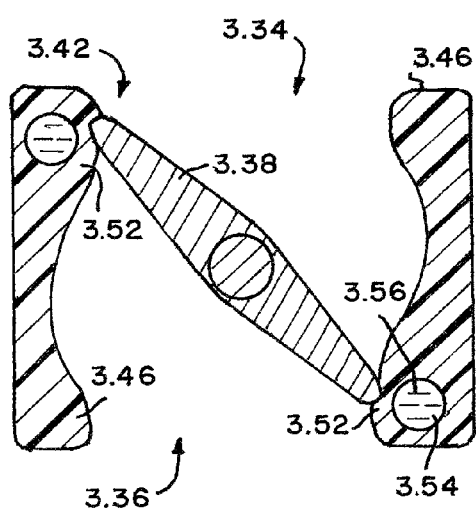
FIG. 20 is similar to FIG. 19, but shows the butterfly wings in a second (closed) position.

Turning to FIGS. 18-20, the third embodiment of the present invention can be described, this time with the seal of the present invention being used within a modified butterfly valve.

Butterfly valve 3.30 has a pair of seals 3.46, each with a void 3.54 therewithin, and, like the other embodiments, voids 3.54 are filled with liquid 3.56. As seen best in FIGS. 19 and 20, each seal 3.46 has a concave surface 2.104 facing the butterfly member 3.38, and the void 3.54 is at one side of each seal, with concave surface 2.104 being closer to butterfly member 3.38 adjacent void 3.54 so that, as the butterfly member 3.38 moves into the second (closed) position, the liquid 3.56 is displaced to cause a better sealing between butterfly member 3.38 and valve body 3.32.

To use valve 3.30, pipes are attached to the first and second ports of the valve, and the butterfly member 3.38 is caused to rotate by a well-known actuator, thereby opening and closing the valve in a manner now understood.

Although the present invention has been described and illustrated with respect to a preferred embodiment and a preferred use therefor, it is not to be so limited since modifications and changes can be made therein which are within the full intended scope of the invention.

I claim:

1. A valve, said valve comprising:
   (a) a valve body having first and second ports;
   (b) a valve member intermediate said first and second ports and mounted within said valve body for movement with respect to said valve body between a first position, in which said first port is in communication with said second port, and a second position, in which said valve member blocks said first port from being in communication with said second port; said valve member having intermediate positions between said first and second positions;
   (c) a resilient seal interposed between said valve body and said valve member, said seal having opposed first and second seal portions and having an intermediate seal portion between said first and second seal portions; said seal having a closed void thereinside extending from said first seal portion to said intermediate seal portion, said closed void extending from said intermediate seal portion to said second seal portion, said closed void having a fixed volume of liquid therein;
   said valve member having a leading edge that contacts said intermediate seal portion with increasing force as said valve member moves through said intermediate positions into said second position, thereby causing some of said liquid to move within said closed void from said intermediate seal portion into said first and second seal portions.

2. The valve as recited in claim 1, in which said seal is received within a channel in said valve body.

3. The valve as recited in claim 1, in which said valve member is not in contact with said intermediate seal portion when said valve member is in said first position.

4. The valve as recited in claim 1, in which an exposed surface of said seal forms a portion of an ellipse proximate said leading edge of said valve member, and in which said leading edge of said valve member forms a partial circular curve, said partial circular curve having a tip and first and second curve portions adjacent said tip, said first and second curve portions being spaced further from said seal than said tip is to said seal when said valve member is in at least some of said intermediate positions.

5. The valve as recited in claim 1, in which said valve member is a prolate spheroid having a major axis and having a bore therethrough transverse to said major axis.

* * * * *